*INVENTORS*
ALFONS MERSMANN,
SANDOR VAJNA,
HANS EPLER

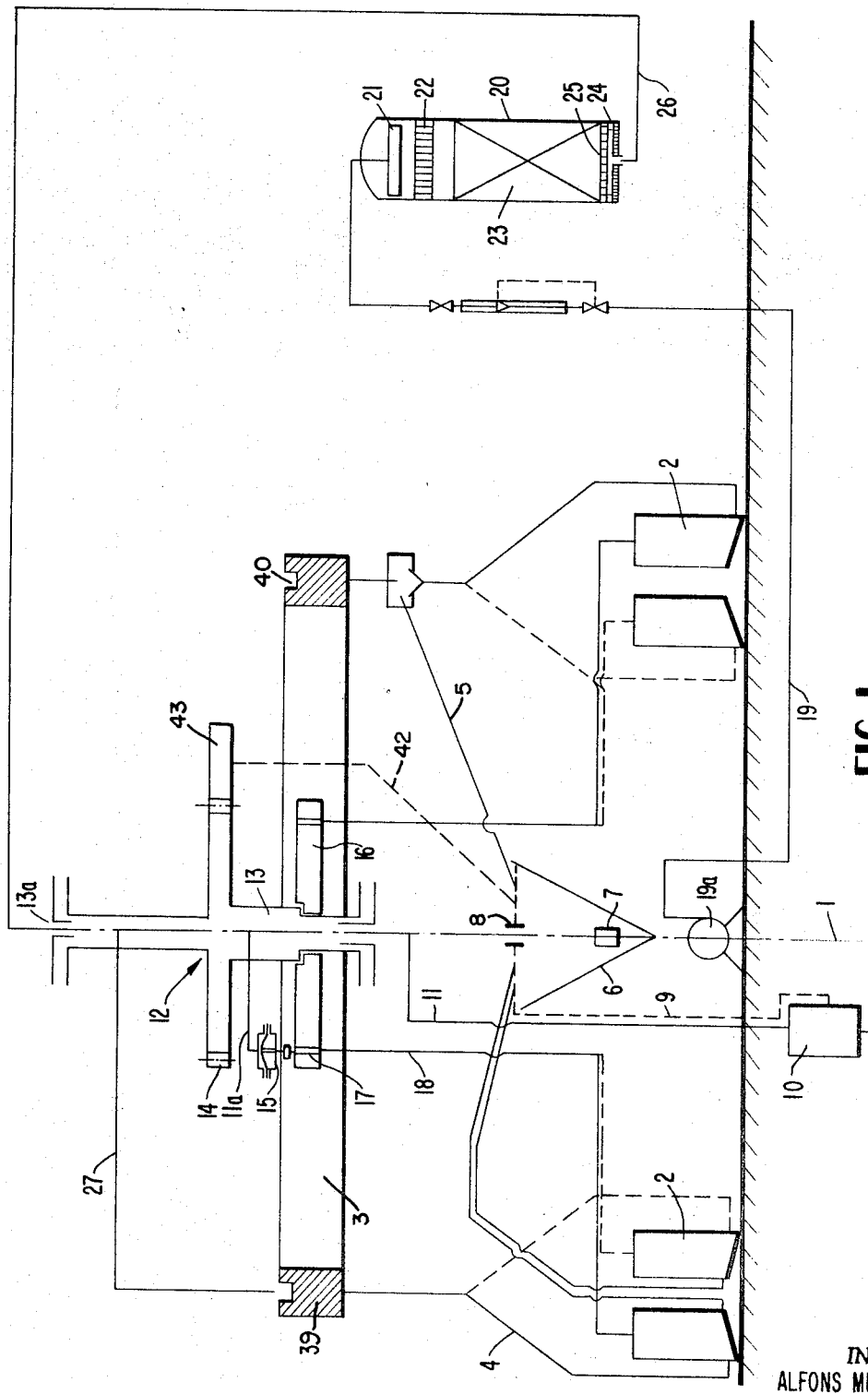

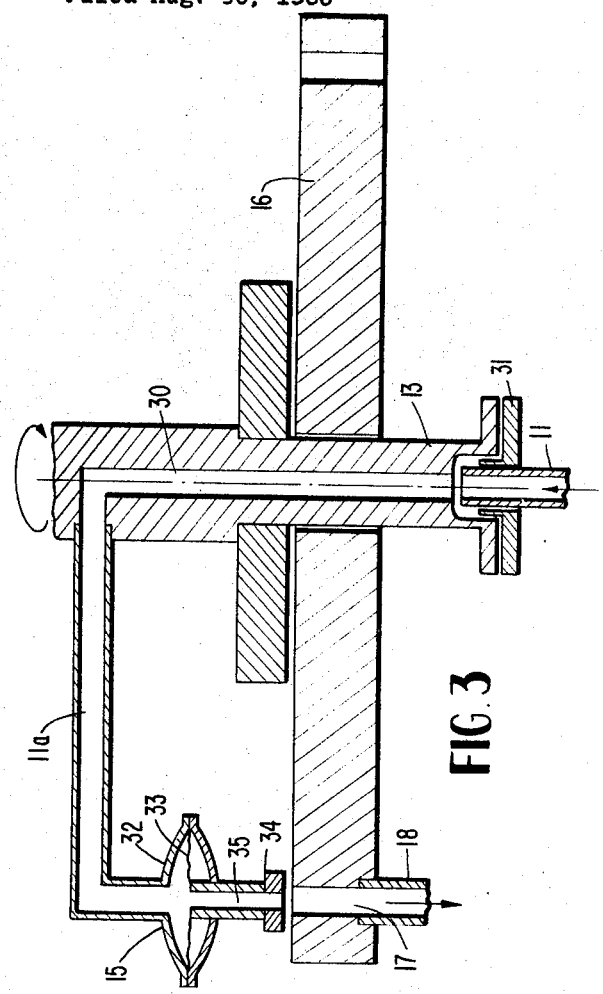
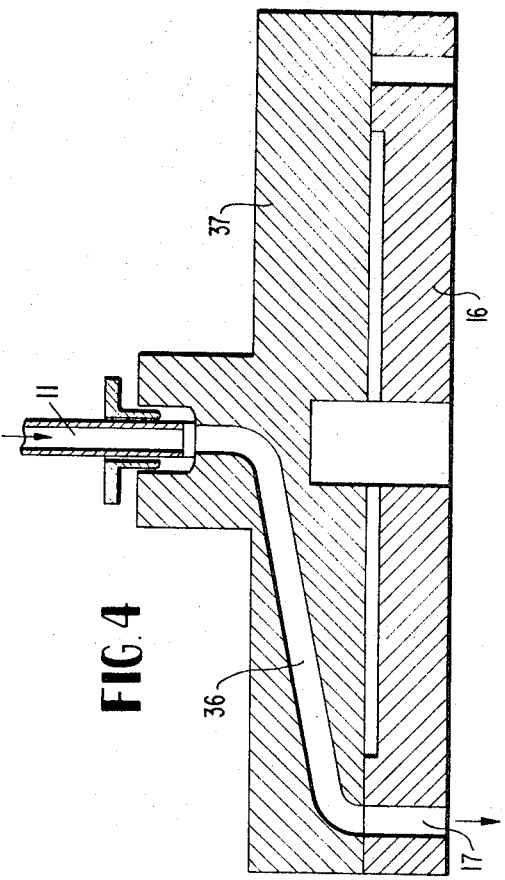
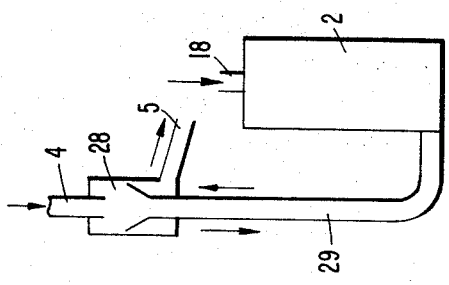
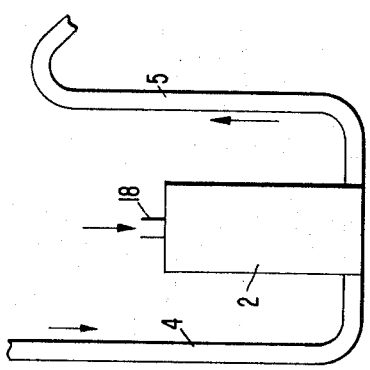
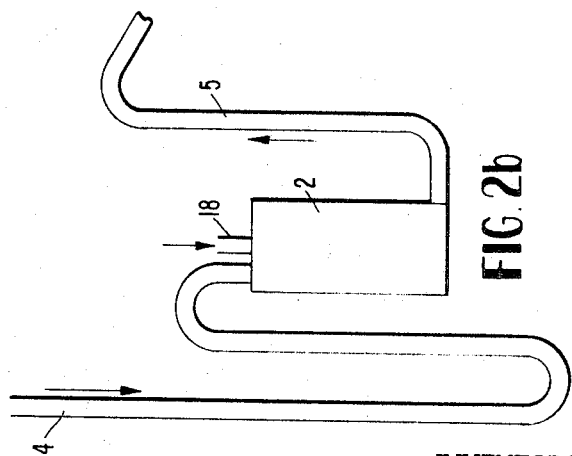

United States Patent Office 3,594,316
Patented July 20, 1971

3,594,316
APPARATUS FOR STORING AND FEEDING FRACTIONS OF A STREAM OF LIQUID FLOWING INTO AND OUT OF A REACTOR OR A PROCESS EXCHANGE APPARATUS
Alfons Mersmann, Ranzel, Sandor Vajna, Rheinbreitbach, and Hans Epler, Ranzel, Germany, assignors to Dynamit Nobel Aktiengesellschaft, Troisdorf, Germany
Filed Aug. 30, 1968, Ser. No. 756,648
Claims priority, application Germany, Sept. 1, 1967, D 53,993
Int. Cl. B01d 33/38, 15/04
U.S. Cl. 210—101
27 Claims

ABSTRACT OF THE DISCLOSURE

The present disclosure is directed to an apparatus for storing, feeding and conveying a liquid fraction which comprises a plurality of pressure-resistant, gas-tight storage tanks, distributor channel means disposed above said storage tanks and divided into a number of compartments corresponding to the number of said storage tanks, a distributing system containing a first liquid feed line associated therewith for introducing the liquid fraction into said compartments, second liquid feed line means for providing communication between each compartment and a storage tank, reservoir means associated with the storage tanks, exhaust line means providing communication between each of the storage tanks and the reservoir means, measuring means disposed in the reservoir means for measuring a predetermined minimum level in said reservoir, gas feed line means providing communication between the storage tanks and a source of pressurized gas, switch means in operative engagement with the measuring means and said source of gas pressure for supplying a pressurized gas through said gas feed line means to the storage tanks in response to a signal received from said measuring means so that the storage tanks can be filled with the liquid fraction and/or drained of the liquid fraction as necessary, means for removing the liquid fraction from the reservoir means and introducing it into a reactor means, and means for removing the liquid fraction from the reactor and introducing it into the distributing system for reintroduction by said first liquid feed line means into the distributor channel.

BACKGROUND OF THE INVENTION

The present invention relates to an apparatus for storing and feeding the fractions which are produced as a result of the distribution of a stream of liquid having either the same or a varying composition, flowing out of a reactor. The fractions are reconveyed to either one or several reactors in a specific sequence, particularly for the purpose of storing and feeding the fractions obtained during the process, necessary for carrying out reactions, for example ion exchange reactions. A portion of the fractions is initially stored separately while care is taken to avoid any intermixture thereof, and these fractions are then passed again over the exchange in an unaltered sequence.

A known installation for carrying out a fractionating process which operates with only one exchanger ion having a static fixed bed and which possesses advantages when compared with various other known devices comprises measuring vessels for the purpose of supplying and discharging water and solution, and storage tanks for storing the fractions, said measuring vessels and storage tanks being provided with supply lines and with discharge lines having built-in valves which must be operated alternately, one after the other. It is also well known to operate several ion exchange tanks successively with an installation of this type. Although this installation operates at a relatively high efficiency, it does involve a considerable expenditure due to the fact that numerous valves are used. Also, there is the risk of a lack of safety during operation.

SUMMARY OF THE INVENTION

An object of the present invention is to avoid the prior art disadvantages in the handling and storing of fractions a material being processed in reactors, process exchange apparatus, and the like.

Another object of the present invention is to provide an improved apparatus for handling, storing and conveying fractions of a material being processed wherein the use of a multiplicity of valves and associated control means can be substantially and effectively eliminated.

A further object of the present invention is to provide an improved apparatus for handling, storing and conveying fractions of a material being processed which achieves a substantial amount of safety during operation.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved apparatus for the handling, storing and conveying of fractions of a material being treated may be obtained by utilizing a plurality of pressure-resistant, gas-tight storage tanks which serve for receiving various fractions of materials. These tanks are each connected by a feed line to a distributor channel or groove, or the like, disposed above said tanks. The distributor channel is subdivided into sections or compartments, each of said sections being associated with a particular tank. Thus, each of the tanks is connected to the distributor channel or groove by feed lines, and in addition, feed means are provided which move along the distributor channel or groove. The feed lines provide communication between the distributor channel and the storage tanks, for example to the lower portion of said tanks. In addition, an exhaust or discharge line is also provided for each of said tanks, for example near the bottom thereof, said exhaust lines for all of said tanks communicating with a common reservoir. Conduit or pipe means are further utilized to provide communication from the reservoir to the inlet opening of a reactor or, respectively, to an exchange apparatus. Each of the storage tanks is further connected by a conduit means disposed, for example, in the upper portion thereof with either a manually or automatically controllable distributor device. By way of said distributor device, each of the tanks is further connected by conduit means to a source of pressure gas which is likewise controllable either manually or preferably, automatically, depending upon the level of the liquid in the storage tank.

According to a further embodiment of the present invention, it is proposed that the storage tanks be disposed in an annular distribution and that the distributor channel be correspondingly provided in an annular manner. Accordingly, the feed lines for the liquid and the gas are pivotably arranged about a centrally-located center of rotation or pivot point.

Alternatively, it is also possible according to another embodiment of the present invention to provide for a column-type linear arrangement of the tanks in either one or several rows which are preferably parallel with respect to each other. In this case, the feed lines for the gas and the liquid are provided and arranged so as to be moveable and operable, respectively, for example by means of a carriage disposed in rows along the correspondingly disposed distributor channels.

The storage tanks may be provided as compartments of a four-cornered box, for example in a honeycomb fashion, or as compartments of either a horizontally-positioned or vertically-positioned cylinder, and are separated from each other by means of walls or partitions disposed at right angles with respect to the cylinder axis. In either case, the tanks may be filled by means of a rotatably connected radial feed means which is moveable in a circular manner over a circular distributor channel containing an annular groove, the latter communicating with the various compartments by means of correspondingly-aligned or oriented pipe elements or sections. In both cases, the feed lines for conveying the liquid to the storage tanks are suitably provided and arranged such that when the line is filled, the level of the liquid column present therein will correspond to the gas pressure being employed to press the storage tanks free of liquid. Thus a storage device which does not utilize a large number of valves and associated controls therefor may thereby be obtained.

The reservoir is advantageously provided as a funnel and the liquid in the reservoir is controlled by means of a float gauge which is connected with a switch which actuates the source of pressure gas so that the latter may be placed into operation when a predetermined minimum liquid level has been reached.

This arrangement has the advantages that the contents of one storage tank can be discharged from the funnel without being intermixed with the contents of another tank; that only a relatively small amount of liquid will still be present in the funnel when the minimum liquid level is reached; that a sufficient amount of space is available in the funnel to allow for the additional flow of more liquid from the next storage tank; and that there is no danger of overflowing. For these same reasons it is additionally possible to cause the switch to be in operative connection with a control element which regulates the filling procedure of the tank so that when one of the storage tanks is pressed empty due to the supply of compressed air, as discussed above, another tank is simultaneously filled with liquid via the feed line.

The operation of filling the tanks may, of course, be also carried out independently of the discharge or drainage from said tanks. In this case, the allotting or feed means is moved and operated by an independent mechanism. Separate devices are then required for the filling operation and for the supply of compressed air. The pace of the movement of the feed means and thus the introduction of the material into the storage tanks depends upon the level of the lquid within the storage tanks. The level may be determined by a float gauge or by another kown element which cooperates with the feed means and brings about the movement of said feed means by the use of contacts or similar instruments, together with relays, amplifiers, hydraulic or pneumatically-acting elements and the like. The float gauge may also be so constructed that it mechanically acts directly upon the feed means by displacing it laterally to the next compartment. The float gauge may further be provided in such a manner that it is positioned in the air exhaust pipe of the storage tank, thus preventing the discharge of air when the desired filling level has been reached. However, in this case, the discharge can be effected only by removing the contents which is initiated by feeding in the compressed air.

Those tanks from which such liquids are fed to the exchange vessel and which are continually re-filled from the outside, are filled either manually or automatically up to the predetermined level. The drainage therefrom is effected in the same manner as that of the other tanks. On the other hand, those tanks which are filled with liquids that are removed after each exchange phase may have a constant or a variable level. The latter provision is necessary, particularly for proportioning the volume of the liquid which is designated as the preliminary run and which consists largely of the water content of the exchanger bed at the beginning of the exchange. This volume depends upon the volume of the exchange bed which varies in conformity with the temperature. Other causes, such as aging, wear and tear, etc., may likewise bring about a change in volume of the exchange bed. In order not to render necessary a variation of the pre-set level of the float guage or of the level-determining device which initiates the movement of the feed means, a water connection equipped with a hand valve is disposed at the tank for the preliminary run, and water is introduced through this water connection either by hand or by a regulatable automatic mechanism in such an amount that the free space remaining in the tank up to the said level of the float gauge corresponds to the requirements which prevail at that particular time.

In order to provide for a uniform supply of the solution flowing out of the funnel-shaped reservoir to the reactor and/or the exchange apparatus, for the purpose of obtaining a uniform distribution therein, the present invention proposes that the introduction of the solution into the reactor and/or the exchange apparatus be controlled by means of a distributor which is provided as a flat cylindrical disk comprising, in a uniform spacing, as many apertures as are necessary having the cross-sectional dimensions such that the liquid will uniformly flow therethrough at all times. The distributor, which is only slightly smaller than the inside cross section of the reactor and/or the exchange apparatus may also be subdivided into two or more equal sectors, all of which are uniformly supplied with the solution via separate lines.

In cases where the rate of introduction of the solutions in which the exchange is intended to take place varies greatly, two distributors must be used. Such a case is the preparation of the boiler feed water in which the water is fed at high speed while the regenerating solution is conveyed at a much lower speed. In this instance, one of the distributors will be made with a diameter which is somewhat smaller than the diameter of the tank. The other distributor which in this case is provided as a hollow ring, is inserted into the narrow space thus formed. The liquid being introduced at high speed is fed into the ring and discharged therefrom through uniformly distributed apertures bored in the bottom. This bottom has advantageously a thickness such that the liquid jets are conveyed in an inclined or sloping manner toward the center through the obliquely bored apertures.

For the purpose of braking the strong liquid jets being discharged from the distributor, it is proposed that a baffle plate be provided as a perforated plate and connected in series behind the distributor. The arrangement of this baffle plate is made in such a manner that the liquid jets discharging from the distributor will strike upon the plate at all times and only thereafter will the braked liquid drip though the apertures. Otherwise, if the jets fall directly into the apertures of the baffle plate, cascade-like elements, for example, must be provided for the purpose of assuring the braking of the liquid jets. In either case, the present invention further proposes that the apertures of the baffle plate, which may be provided, for example as a pipe assembly or, if desired, as a sloping arranged pipe assembly, be so constructed at the outlet side thereof that the separate discharge or drainage of the liquid is assured. The present invention further proposes that the baffle plate have a diameter only slightly smaller than the inside diameter of the reactor and that the exchange apparatus be equipped with a collar which intercepts any spattering of the solution which is laterally deflected.

A float gauge control is also suitably provided for the reactor and/or the exchange apparatus so as to keep constant the level of the liquid layer above the exchanger. In the case of an ion exchanger, this float gauge control may consist of a float gauge resting upon the resinous surface of the exchanger as well as a float gauge resting on the liquid and being connected with the former, the mutual level of which is used for regulation so that a constant liquid layer above the resinous exchanger surface is assured independent of any possible variations in the height thereof.

When two distributors are used, the double float gauge is put out of operation and a high liquid layer is maintained above the exchanger bed so that the charge is only slightly whirled or not whirled at all by the strong jets. It should be noted that during the introduction of water, no fractions are present, but the total quantity of the liquid that is admitted is the same.

For the purpose of discharging the liquid from the reactor and/or the exchange apparatus, the present invention proposes the use of a sealing or gasket preferably made of rubber and containing grooves, as well as a passage or flow-through member, for example a filter plate, disposed in series above the gasket.

Instead of using a gasket of the type discussed above containing grooves, the passage or flow-through member may be provided with grooved nozzles, porous disks or the like, each of which terminate in a short piece of conduit or pipe disposed therebelow and directly connected with the discharge or exhaust line. For large tank diameters, several of these pipe pieces may terminate in combined intermediate lines extending to the main line.

BRIEF DESCRIPTION OF THE DRAWINGS

The present invention will become more fully understood from the detailed description given hereinbelow and the accompanying drawings which are given by way of illustration only and thus are not limitative of the present invention and wherein:

FIG. 1 is a schematic illustration of the apparatus of the present invention;

FIGS. 2a, 2b, and 2c illustrate several embodiments showing the connection of the feed lines and discharge or exhaust lines with the storage tanks;

FIG. 3 shows one embodiment of the construction of the pressure gas feed means;

FIG. 4 shows another embodiment of a feed means which can be used both for the pressure gas and for the liquid;

DESCRIPTION OF THE PREFERRED EMBODIMENTS

Figure 5:
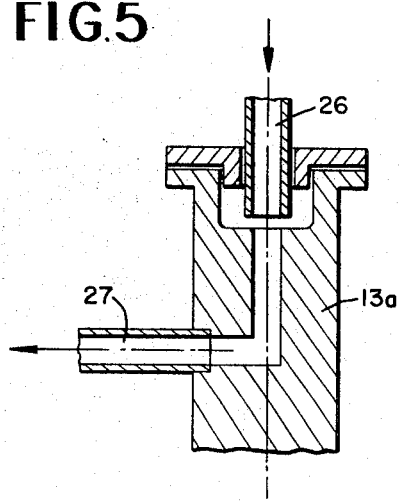
FIG. 5 shows, in detail, how the fixed exhaust line of the exchange apparatus communicates with the rotary head of the distribution device and how the radial feed line can rotate with the rotary head.

Referring now to the drawings wherein like reference numerals are used throughout the various views to designate like parts, the apparatus of the present invention comprises storage tonks disposed in a circular and uniformly distributed manner around the axis 1 of the system. Arranged above the storage tanks 2 is a circular distributor channel or groove 3 which is subdivided beyond its circumference, in a manner not further illustrated herein, into a number of compartments corresponding to the number of storage tanks 2. Each of these compartments communicate with one storage tank 2 by way of a feed line 4. Each of the storage tanks 2 are in further communication with the centrally positioned funnel-shaped reservoir 6 by way of an exhaust line 5. The reservoir is controlled by means of a float gauge 7. That is, the float gauge is in operative engagement with switch 8 in such a manner that when the liquid surface has reached a predetermined minimum level, the switch 8 actuates a source of gas pressure (not shown) via the connection 9 and the control member 10. The float can transmit its relative position in the collecting tank 6 to the switch by way of mechanical linkage. Of course, instead, the provision can also be made to transmit the signal from the float 7 to the switch 8 by electric, pneumatic, hydraulic, or some other means, the switch, in turn, actuating in a likewise conventional manner, by way of control element 10, the pressure shaft, which is not shown in the drawing.

The source of gas pressure is connected by way of the control member 10 and the line 11 with the centrally-disposed rotary system 12 positioned above the reservoir 6. Via the toothed wheel or ring gear 14, the rotary head 13 is pivoted or turned about an axis of rotation which coincides with the axis 1 of the system. The radial element 11a which is rotatably connected with line 11 is also pivoted or rotated about the axis of rotation, that is axis 1 of the system. At that time, the feed means 15 moves successively over apertures 17, circularly disposed in the stationary perforated plate 16, and each of the apertures is connected by way of a line 18 with a storage tank 2.

From the reservoir 6 the liquid flows via pump 19a and the line 19 to the exchange apparatus 20 where it is initially uniformly distributed by means of the distributor 21. The liquid jets discharging through the distributor in a downward direction are subsequently braked by a series-connected baffle mechanism 22 so that said liquid will only drip in the downward direction. After flowing through the resinous exchanger packing 23, the liquid is passed over the gasket 24 which is provided with grooves (not shown), and via plate 25 having passage or flow-through openings, to the exhaust line 26. The liquid is then conveyed through said exhaust line to an additional rotary head 13a and over the radial feed line 27, which is connected in a fixed disposition or fashion with the rotary head 13a and in a rotatable manner with respect to line 26, to the various compartments in the circular distributor groove 3. Thus, fixed conduit 26 communicates with the rotary head 13a, the latter element being adapted to rotate together with line 27.

It is understood that the lines 11a and 27 are so mounted to the rotary heads 13 and 13a that the desired compartment of the distributor groove 3 and, respectively, the desired storage tank 2 is filled with liquid at all times, while the correspondingly provided storage tank 2 is likewise simultaneously and at all times pressed empty by means of pressure gas and drained into the reservoir 6.

As is apparent from FIG. 2a, both the feed line 4 and the exhaust line 5 may be connected or disposed at the bottom of the storage tank 2. According to FIG. 2b, the feed line 4 is disposed at the upper end thereof and only the exhaust line 5 is disposed at the bottom of the storage tank 2. According to FIG. 2c, the feed line 4 and the exhaust line 5 are disposed at the bottom of the storage tanks 2 extending from a distributor section 28 by means of a combined line or pipe section 29 serving for both the introduction and for the exhaust of the solution. In all three cases, the pressure gas-connecting line 18 is disposed in the same manner in the upper portion of the storage tanks 2.

According to FIG. 3, which shows the lower portion of the rotary system 12 in an enlarged scale, the pressure gas feed line 11 is introduced into the lower end of the rotary head 13 with the aid of a packing box 31 and connected to the bore 30 thereof. Also, connected to the bore 30 is the radial line or pipe 11a which is provided in its downwardly extending free end section with a diaphragm box 32 having a diaphram 33 and a stopper 34 secured thereto.

If, in the position of the feed means 15 as shown, in which stopper 34 is positioned above one of the bores 17 of the stationary perforated plate 16, pressure gas is supplied via line 11, the pressure thereof which is exerted on the diaphragm 33 has the result that the stopper 34 is pressed on the perforated plate 16. Thus the pressure gas will flow without loss from the line 11a through the opening in the diaphragm 33, the bore 35 of the stopper 34 as well as the bore 17 of the perforated plate 16 into the line 18.

The slightly different embodiment shown in FIG. 4 may be employed for both the supply of gas pressure and for the supply of liquid. Disposed on the stationary perforated plate 16, which contains a plurality of bores 17 corresponding to a given number of compartments of the distributor channel or groove 3, and, respectively, of storage tanks 2, and rotatable about the axis of rotation, is a disk 37 containing the line 36. Line 36 is connected to another line, for example line 11 in the same manner as shown in FIG. 3, so that the medium will have free passage at all times in the direction of the arrow whenever the outer end of the radial line 36 is positioned opposite one of the apertures 17.

FIG. 5 shows how the fixed exhaust line of the exchange apparatus communicates with the rotary head of the distribution device and how the radial feed line can rotate with the rotary head.

Figure 6:
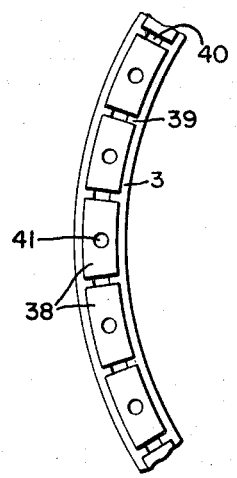
FIG. 6 shows, in plan view, a portion of the distributor channel.

FIG. 6 shows a fragment of the distributor channel with several sections 38, separated from one another by the partitions 39. The partitions 39 are provided with rectangular cut-outs 40 at their upper edges to make it possible for the distributor 27, extending somewhat into sections 38, to advance from section to section (see in this connection FIG. 1). Each section 38 is provided with an outlet opening 41 in communication with, respectively, one storage container 2 via conduit 4. In order to facilitate the efflux of the liquid from section 38, the latter can be fashioned with a sloped bottom. In this case, the discharge opening 41 is, of course, disposed at the lowest point.

Figure 7:
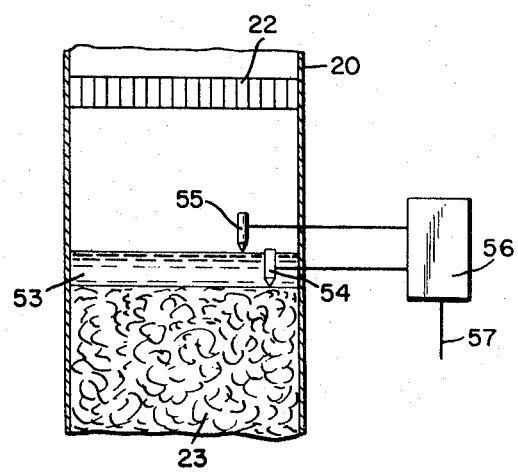
FIG. 7 shows a fragmentary view of a longitudinal section of the exchange apparatus.

FIG. 7 shows a fragmentary view of a longitudinal section of the exchanger 20. The liquid level 53 is above the exchange resin packing 23. The float 54 rests on the surface of the exchange resin, and the float 55 rests on the surface of the liquid. The vertical displacement of both floats are transmitted to the common control element 56 and processed in such a manner that the pulse transmitted via the connection 57 to a regulator, not shown, ensures as constant a level of the liquid layer 53 over the exchange resin packing 23 as possible. In this connection, the control element 56 can, of course, also be disposed within the exchanger 20.

Figure 8:
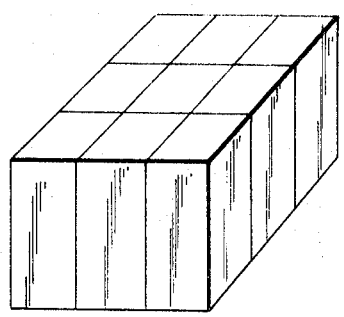
FIG. 8 shows a square container subdivided by appropriate partitions into nine storage containers.

FIG. 8 shows a square container subdivided, in this embodiment, by means of appropriate partitions, into nine storage containers.

Figure 9:
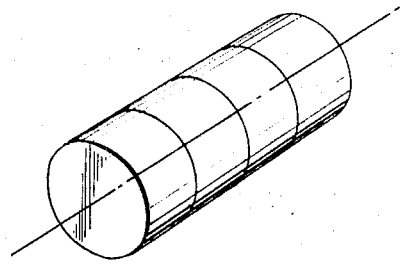
FIG. 9 shows a cylindrical container subdivided into four disc-shaped storage containers which can be disposed in the prone or upright positions.

FIG. 9 shows a cylindrical container subdivided into four disc-shaped storage containers which can be disposed prone or upright. The required conduits are connected to the individual storage containers as illustrated in FIGS. 1 and 2.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. An apparatus for storing, feeding and conveying a liquid fraction which comprises a plurality of pressure-resistant, gas-tight storage tanks, distributor channel means disposed above said storage tanks and divided into a number of compartments corresponding to the number of said storage tanks, a distributing system containing a first liquid feed line connected between said distributing system and said compartments for introducing the liquid fraction into said compartments, second liquid feed line means connected between each compartment and a storage tank, reservoir means associated with the storage tanks by exhaust line means provided communication between each of the storage tanks and the reservoir means, measuring means disposed in the reservoir means for measuring a predetermined minimum level in said reservoir, gas feed line means connected between the storage tanks and a source of pressurized gas, switch means in operative engagement with the distributing system, with the measuring means and said source of gas pressure for supplying a pressurized gas through said gas feed line means to the storage tanks in reponse to a signal received from said measuring means so that the storage tanks can be filled with the liquid fraction and/or drained of the liquid fraction in response to the measurement of said predetermined minimum level, means for removing the liquid fraction from the reservoir means and introducing it into a reactor means, and means for removing the liquid fraction from the reactor and introducing it into the distributing system for reintroduction by said first liquid feed line means into the distributor channel.

2. The apparatus of claim 1, wherein the distributing means further comprises a rotary system centrally disposed with respect to the distributor channel containing a rotary head provided with a ring gear for pivoting about an axis of rotation, a stationary plate means disposed below the ring gear and containing a plurality of apertures and a feed means which is associated with the rotary head via a radial line and fixed to rotate therewith, thereby permitting said feed means to successively align itself with said apertures.

3. The apparatus of claim 2, wherein each of the apertures is connected with a storage tank by conduit means.

4. The apparatus of claim 3, wherein the feed means communicates with a source of pressurized fluid via a radial element, the rotary head and conduit means.

5. The apparatus of claim 1, wherein the reactor is provided in its upper portion with a distributor means for introducing the liquid fraction uniformly into said reactor and a sieve-like baffle mechanism for braking the liquid jets being discharged from the distributor means.

6. The apparatus of claim 5, wherein the reactor is provided in its lower portion with a plate means provided with flow-through openings and a gasket means disposed below the plate means and provided with grooves.

7. The apparatus of claim 1, wherein the second liquid feed line means from the distributor channel and the exhaust line means are both connected to the lower portion of the storage tank.

8. The apparatus of claim 1, wherein the second liquid feed line means from the distributor channel is connected to the upper portion of the storage tank and the exhaust line means is connected to the lower portion of the storage tank.

9. The apparatus of claim 1, wherein the second liquid feed line means from the distributor channel and the exhaust line means communicate with the lower portion of the storage tank as a combined line serving for both the introduction and exhaust of the fluid fraction, said combined line terminating in a distributor section where the feed lines and exhaust line are again separated into two separate lines.

10. The apparatus of claim 2, wherein the feed means comprises a diaphragm box containing a diaphragm which is provided with an aperture which communicates with a downwardly extending bore means which terminates as a stopper means.

11. The apparatus of claim 10, wherein the feed means is connected with the rotary head by a radial element which provides a means for the communication of the pressurized gas to the feed means, said feed means being fixed to rotate with said rotary head.

12. The apparatus of claim 1, wherein the distributing system comprises a rotatably disposed disk means containing a radial line, said disk means being disposed above a stationary plate means containing a plurality of apertures, said radial line being adapted to alignment with any of said apertures.

13. The apparatus of claim 1, wherein the storage tanks are arranged in an annular distribution and the distributor channel is also provided in an annular manner and wherein the first liquid feed line and the gas feed line are rotatably disposed about a centrally-located point of rotation.

14. The apparatus of claim 1, wherein the storage tanks are arranged in one row, substantially parallel with respect to each other, and wherein the first liquid feed line and, the gas feed line are movably positioned by a carriage means, along the rectilinearly disposed distributor channel.

15. Device according to claim 1, wherein the reservoir is funnel shaped.

16. The apparatus of claim 5, wherein the liquid distributor is provided as a flat cylindrical hollow disk with a bottom having a plurality of apertures.

17. The apparatus of claim 1, wherein the reactor contains a resinous charge and the surface of the liquid fraction in the reactor is controlled by the relative levels of two float gauges, one of which responds to the level of the resinous charge and the other which responds to the level of the liquid fraction.

18. The apparatus of claim 6, wherein the plate means comprises filter plates.

19. The apparatus of claim 1, wherein the distributing system further comprises a centrally disposed rotary system positioned above the reservoir means, said rotary system containing a rotary head provided with a ring gear for pivoting about an axis of rotation, which coincides with the axis of the reservoir, a stationary plate means disposed below the ring gear and containing a plurality of apertures and a feed means which is associated with the rotary head via a radial line and fixed to rotate therewith, thereby permitting said feed means to successively align itself with said apertures.

20. The apparatus of claim 1, wherein the storage tanks are arranged in several rows, substantially parallel with respect to each other, and wherein the first liquid feed line and the gas feed line are movably positioned by a carriage means along the rectilinearly disposed distributor channel.

21. The apparatus of claim 6, wherein the plate means comprises grooved nozzles.

22. The apparatus of claim 6, wherein the plate means comprises bells.

23. An apparatus for storing, feeding and conveying a liquid fraction which comprises a plurality of pressure-resistant, substantially gas-tight storage tanks, a distributor channel means disposed above said storage tanks and divided into a plurality of compartments corresponding to the number of said storage tanks, a reservoir means and a reactor means, a first distributing system comprising a first plurality of conduit means connecting the distributor channel with the storage tanks, the storage tanks with the reservoir means, the reservoir means with the reactor means and the reactor means with the distributor channel and a second distributing system comprising a second plurality of conduit means connecting the storage tanks with a source of gas pressure, measuring means disposed in the reservoir means for measuring a predetermined minimum level in said reservoir, and switch means in operative engagement with the distributing system, with the measuring means and said source of gas pressure for supplying a pressurized gas through said second plurality of conduit means to the storage tanks in response to a signal received from said measuring means, the storage tanks of the apparatus thus adapted to be filled with a liquid and/or drained of the liquid fraction in response to the measurement of said predetermined minimum level.

24. The apparatus of claim 23 wherein the first distributing system further includes a rotary system centrally disposed with respect to the distributor channel and containing a rotary head provided with a ring gear for pivoting about an axis of rotation, one of said first plurality of conduit means which provides communication between the reactor means and the distributor channel consisting essentially of exhaust line means which provide communication between said reactor means and the rotary head and radial feed line means which rotates with the rotary head and provides communication between said head and the distributor channel.

25. The apparatus of claim 24, wherein the second distributing system further includes a stationary plate means disposed below the ring gear and containing a plurality of apertures and a feed means which is rotatably associated with the rotary head via a radial line thereby permitting said feed means to successively align itself with said apertures and facilitate communication between the storage tanks and the source of gas pressure through said second plurality of conduit means.

26. The apparatus of claim 23, wherein the storage tanks are in the shape of a four-cornered box divided by partition means into a plurality of compartments.

27. The apparatus of claim 23, wherein the storage tanks are in the shape of a horizontal or vertically-positioned cylinder divided into a plurality of compartments by partition means disposed at right angles with respect to the cylinder axis.

References Cited
UNITED STATES PATENTS

| | | | |
|---|---|---|---|
| 563,660 | 7/1896 | Gaillet | 210—101 |
| 665,606 | 1/1901 | Kennicott | 210—101 |
| 793,727 | 7/1905 | Kniffler | 210—101 |
| 1,290,538 | 1/1919 | Gamble | 210—101 |
| 2,301,025 | 11/1942 | Friena et al. | 210—405X |
| 2,504,610 | 4/1950 | Wolf | 210—341 |

JOHN ADEE, Primary Examiner

U.S. Cl. X.R.

210—104, 152, 195, 405; 137—101.17, 158